United States Patent [19]

Bernard et al.

[11] 4,001,975
[45] Jan. 11, 1977

[54] TWIST DRILL SHARPENER AND ALIGNING FIXTURE

[75] Inventors: Arthur Alexander Bernard, Beecher; Richard Allen Bernard, Flossmoor, both of Ill.

[73] Assignee: Darex Corporation, Beecher, Ill.

[22] Filed: July 9, 1975

[21] Appl. No.: 594,349

[52] U.S. Cl. .............................. 51/5 R; 51/219 PC; 51/277

[51] Int. Cl.² .......................................... B24B 3/30

[58] Field of Search ................ 51/5 R, 5 D, 101 R, 51/127, 219 R, 219 PC, 277

[56] References Cited

UNITED STATES PATENTS

| 1,582,014 | 4/1926 | Kendall | 51/277 |
| 2,109,308 | 2/1938 | Adams | 51/219 PC |
| 2,124,093 | 7/1938 | Wells | 51/219 PC |
| 2,147,227 | 2/1939 | Ambler | 51/219 PC |
| 2,445,194 | 7/1948 | Umbdenstock | 51/219 PC X |

*Primary Examiner*—Al Lawrence Smith
*Assistant Examiner*—Nicholas P. Godici
*Attorney, Agent, or Firm*—Harold L. Stowell

[57] ABSTRACT

A twist drill sharpener employing a rotary grinding wheel has a twist drill chuck which mounts a pair of cams which are locked to the chuck when the lips of the twist drill are aligned in an aligning fixture and then the chuck, cams and drill are inserted in a second fixture provided with a pair of cam followers which in conjunction with the chuck carried cams control the grinding of the twist drill.

17 Claims, 12 Drawing Figures

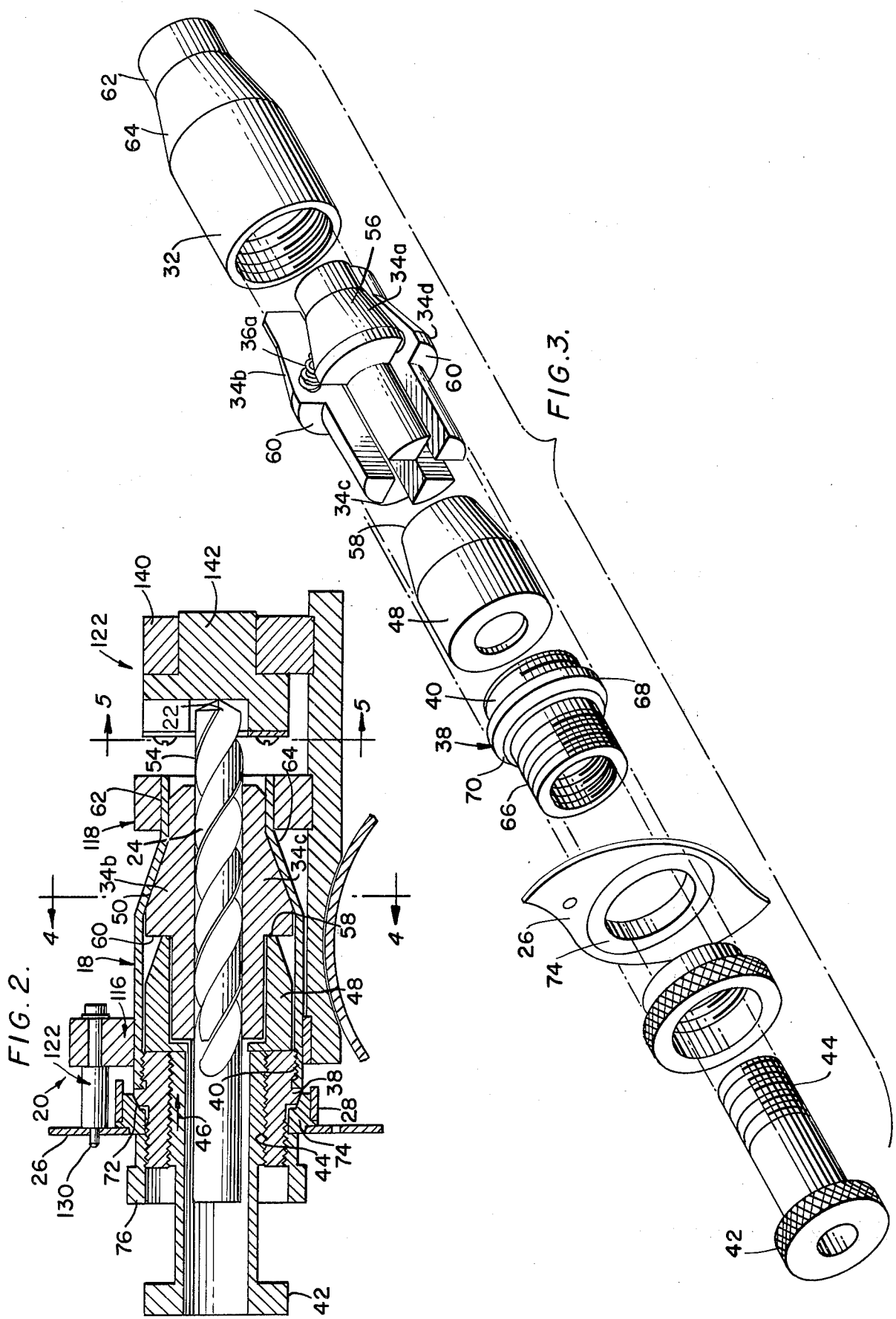

TWIST DRILL SHARPENER AND ALIGNING FIXTURE

BACKGROUND OF THE INVENTION

Common twist drills are a very standardized tool and when purchased new the geometry at the cutting end of twist drills is a standardized geometry generally selected by the Metal Cutting Tool Institute as the best geometry for all general purpose drilling and is an included point of 118°, a lip relief angle of 6° to 18° (depending on drill diameter), a chisel edge angle of 120°–130°, and the center of the chisel edge accurate to within 0.003 inch with the axis of the drill. Drills with this standarized point geometry are purchasable at hardware stores and industrial supply distributors by homeowners, hobbyist, auto mechanics, building tradesmen, millrights and machinists.

If the drill point angle and/or the cutting lip relief angle needs to be different than standardized geometry to more efficiently drill a softer material such as wood or plastic which is generally drilled with a 90° point or a hard metal such as manganese bronze which is generally drilled with a 135° point, then the geometry must be changed by regrinding before the new drill is used.

Good quality high-speed steel twist drills are expensive, for example, the average current list price for ⅛ inch size is about $0.60, for 5/16 inch size about $1.75 and for ½ inch size about $4.00. Yet, only a very small percentage of the twist drills purchased are ever resharpened because it is very difficult for even a master machinist to resharpen the cutting lips by hand and produce the most efficient geometry. Generally, drills resharpened by hand remove material inefficiently, quickly become overheated, lose their sharpness and are scraped.

For these reasons thousand of small manufacturers scrap a number of twist drills per day and at an estimates average cost of $2.00 each. Such loss can amount to a hundred and more dollars per week per manufacturer.

The size of possibly not less than 5 percent of all twist drills manufactured and used are within the range of 1/16 inch to ½ inch diameter and within this range there are 29 fractional inch sizes, 26 letter sizes, 56 numeral sizes, and 140 millimeter sizes, and one of the main objects of this invention is to provide a drill sharpener whereby all of these different sizes of drills, about 250 in all, can be handled by one relatively inexpensive drill holding chuck, instead of having to use 250 different sizes of collets for handling each of the 250 different sizes of drills as is the general practice with most prior art drill sharpeners.

SUMMARY OF THE INVENTION

The drill sharpener of the invention produces the required configuration of movements at the cutting end of twist drills during the sharpening operation to quickly, accurately, and simultaneously grind and sharpen the cutting lips of two, three, four, etc. flute twist drills to any preferred drill point angle, to any preferred lip relief angle, to any preferred chisel angle, and very accurately locate the center of the chisel point with the center of the drill, by simply manually rotating a chuck containing the drill in a fixture as the cutting end of the drill is manually pressed against the face of a rotating grinding wheel.

In regards to the standardized geometry, it is pointed out that the relief angle of the two cutting lips increases from the periphery to the center of the drill. For example, a relief angle referred to as 12° is the relief at the peripheral end of the cutting lips and this 12° gradually increases to where the relief angle at the chisel point can be double that at the periphery, and more, depending on the diameter of the drill.

In general, the invention includes a small light-weight base on which is mounted an electric motor which mounts a 6 inches diameter grinding wheel with, for example, a ¾ inch width face.

The assemble includes a separately handled drill chuck having four jaws long enough to span the full length of one complete spiral of the flutes of the drill which for a ½ inch diameter drill with a standard helix angle is 2 and seven-eights inches long, and grip the drill close enough to the point to prevent vibration during the grinding operation. The drill chuck mounts two cams integral with each other which are normally free to rotate on the chuck but by the use of a clutch tightened by a hand knob are clutched to the chuck after the drill is clamped by the four jaws.

A fixture supported by the base has two purposes, namely, (1) to establish an exact dimension between the tip of the drill and one of the two integral cams before the drill is griped by the four jaws of the chuck, and (2) to very accurately align the two cutting lips of the drill with the second cam before the clutch is tightened to lock the two integral cams to the body of the chuck.

In addition the assembly includes a second fixture used for producing the required geometry at the cutting end of the drill during the sharpening operation. The second fixture has two bearings into which the drill chuck is inserted after the two lips of the drill are aligned with the two integral cams in the first fixture. The fixture is hinge mounted on the base portion, and by merely applying a light push force on the chuck as the chuck is manually rotated clockwise in the fixture one cam follower follows the face of one of the two integral cams which feeds the end of the drill toward the face of the grinding wheel while simultaneously a second cam follower following the face of the second integral cam swings the end of the drill away from the face of the grinding wheel, and, as will be more fully described hereinafter, it is by feeding the end of the drill toward the face of the grinding wheel with one cam while simultaneously using a second cam to swing the end of the drill away from the face of the wheel which produces the relief angle.

The base plate for the second fixture is also hinge mounted to a mid-base section which permits the base plate for the fixture to hinge or pivot to any preferred angle required to produce any drill point angle from zero to an included 90° point and the mid-base section in turn is hinge mounted to a subbase member and this base is rigidly bolted to the main base of the drill sharpener with the axis of the hinge pin at 90° in relation to the axis of the motor shaft, and hence, 90° to the face of the grinding wheel. This third hinge means provides important unique objectives, namely, by turning a screw with a hand knob, a shank mounted diamond clamped in the drill chuck can be moved across the face of the grinding wheel to dress the face if and when needed. Further, by turning this same hand know, the point of the drill in the chuck can be moved to any preferred area on the face of the grinding wheel thus maintaining a smooth surface which practically eliminates the need for dressing the face of the grinding wheel. One end of the hinge pin is threaded and with a matching thread hand knob so that the fixture and its base plate can be moved toward or away from the face of the grinding wheel to compensate for grinding wheel wear and the hand knob may have a graduated scale with each line representing a forward movement of 0.003 inch toward the face of the grinding wheel and, hence, with each 360° manual rotation of the drill chuck, the point of the drill is moved 0.003 inch towards the grinding wheel and, with only 0.003 inch removed from the lips of the drill with each 360° rotation of the chuck, the metal cutting efficiency of the drill is not reduced by overheating.

The hereinbefore described mechanism may be simply defined as a twist drill sharpener comprising a rotary metal grinding wheel, a twist drill chuck having a cyclindrical body, dual drill grinding control cams rotatably mounted on the chuck and means for locking the dual cams against rotation relative to the chuck, means for aligning the lips of a twist drill to be sharpened with the dual cams, aligning means including a first fixture adapted to receive the cyclindrical body of the chuck and the first fixture including means engaging the dual cams and a pair of opposed blocks slidably into engagement with the lips of the chuck supported twist drill, a second fixture adapted to rotatably and slidably receive the cylindrical body of the chuck, means mounting the second fixture so that the longitudinal axis of the cylindrical body of the chuck intersects a surface of the grinding wheel and the said means including means for angular displacement of the chuck support about a vertical axis relative to the grinding wheel and first and second cam followers on the second fixture adapted to be engaged by the control cams on the chuck.

BRIEF DESCRIPTION OF THE DRAWING

FIG. 2 is a section on line 2—2 of FIG. 1;

FIG. 3 is an exploded view of the drill holding chuck assembly shown in FIG. 2;

DESCRIPTION OF THE PREFERRED EMBODIMENT

Figure 1:
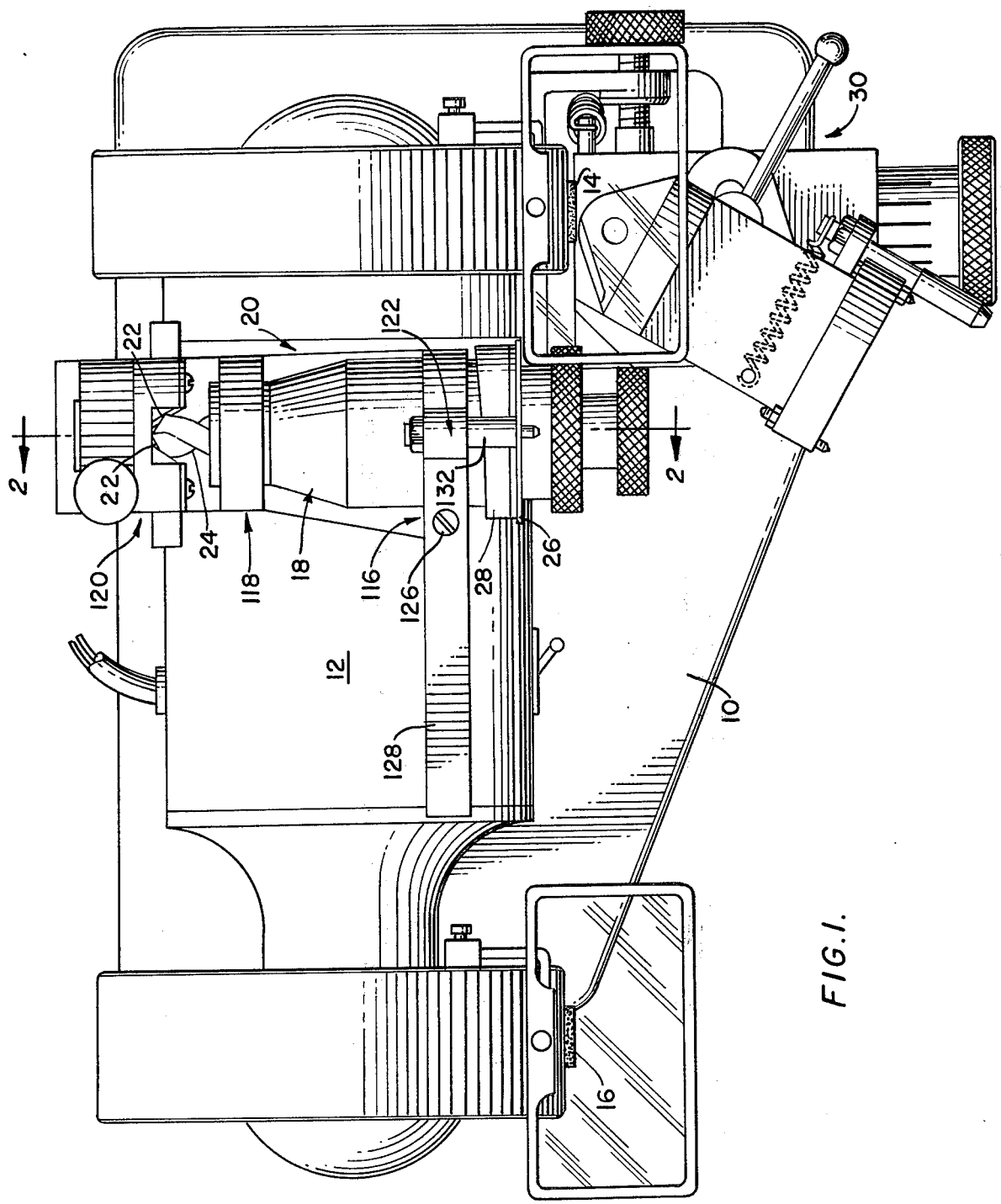
FIG. 1 is a top plain view of a drill sharpening device constructed in accordance with the teachings of the present invention.
Figure 6:
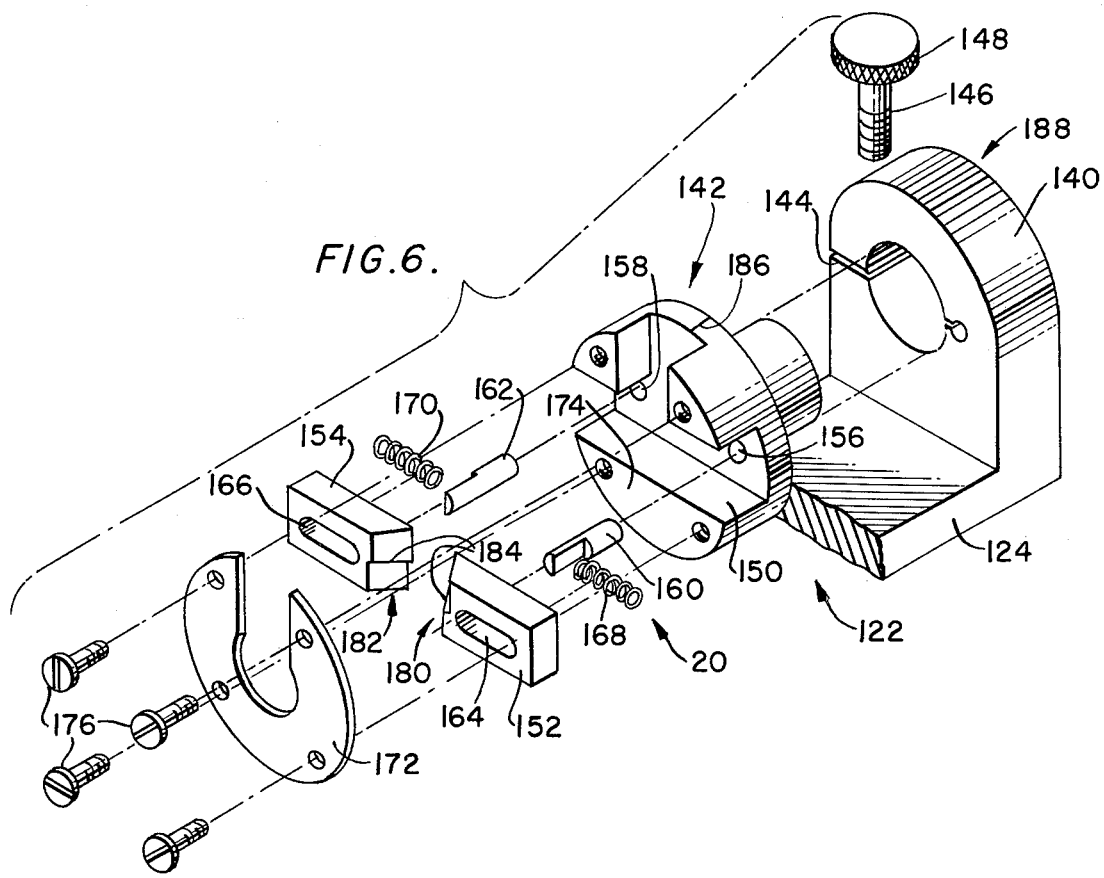
FIG. 6 is an exploded fragmentary detailed perspective view of a portion of the drill bit aligning means comprising an aspect of the present invention.

Referring to FIG. 1, the drill sharpeners of the invention as a whole include a metal base 10. Mounted on the base 10 is, for example, a ⅓rd H.P., 3450 R.P.M. electric motor 12. The motor in the illustrated form of the invention has a double ended shaft on which are mounted two 6 inch diameter grinding wheels 14 and 16 preferably with a ¾ inch face. The grinding wheel 14 shown on the right is for the drill sharpening assembly and the wheel 16 on the left is for general use. The drill chuck 18 is shown inserted into the aligning fixture 20 and is used for aligning the cutting lips 22 of the drill 24 with a zero starting point on the two integral cams 26 and 28 prior to being transferred to the second or sharpening fixture 30 which is illustrated in greater detail in FIGS. 7–10.

As will be described in more detail hereinafter, when the drill chuck 18 is inserted into the fixture 20, the integral cams 26 and 28 are free to rotate on the chuck 18 and it is after the alignment of the two cutting lips 22 that the clutch is engaged by turning a hand knob and this locks the zero starting point of the cams with the lips 22 of the drill 24.

THE DRILL CHUCK

Figure 4:
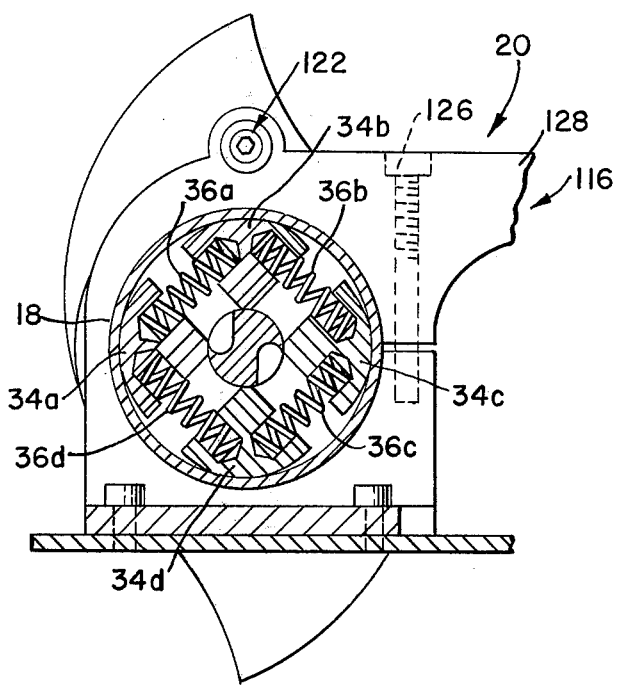
FIG. 4 is a section on line 4—4 of FIG. 2.

Referring now to FIGS. 2, 3 and 4 the drill chuck portion 18 of this invention consists of an outer tubular shaped body 32; a set of four drill gripping jaws, 34a, 34b, 34c and 34d; a set of four heavy duty compression springs 36a, 36b, 36c and 36d; a first bushing 38 which is threaded at 40 into one end of the tubular shaped body 32 of the chuck; a hand knob 42 which threads as at 44 into the first bushing 38 and is used for developing a push force indicated by arrow 46 which is applied to a second bushing 48 from where the push force is applied to the four jaws 34a, 34b, 34c, and 34d which are forced down through an included 36° cone shaped incline 50 to grip the drill 24.

For reasons which will be more fully described hereinafter, it is important to notice that the four jaws 34a, 34b, 34c and 34d are long enough to span one complete 360° spiral of that portion to twist drills commonly called the margin portion 54, and that each of the four jaws grip the drill in at least two locations of the two margins of the twist drill. It is also important to note that with this form of construction of the chuck the axis of all four jaws are parallel with the axis of the drill 24 which would not be the case if even only one of the four jaws contacted only one of the margins at only one location, because the drill would rock at this single point contact and hence the axis of the drill would not be parallel with the axis of the chuck. It was discovered that the axis of the drill has to be (1) exactly parallel with the axis of the chuck and (2) that the axis of drill has to be exactly in the center of the chuck. To provide both of these requirements the jaws of the chuck have to be long enough to span a full 360° spiral of the margins of the drill and which for a ½ inch diameter drill the jaws have to be not less than 2⅜ inches long. The diameter of the tubular shaped body 32 of the chuck 18 shown in the drawing is only 1⅞ inches, and this small size was made possible by the configuration shown. Thus, the length of the jaws 34a, 34b, 34c and 34d should not be less than five times the diameter of the largest diameter drill the chuck will accommodate or, as stated above, the length of the jaws must not be less than one 360° spiraled open flute or margin.

Further, it will be noted that the quarter cone shaped portion 56 of each of the jaws is only about ⅓rd the total length of the jaws when the included angle is 18° as shown. If the length of the cone formation 56 was the length of the jaws, the slope of the incline would be only about 8° and hence the end of the jaws would protrude much too far beyond the end of the chuck body when a small 1/16 inch diameter drill is gripped by the jaws and with only about an 8° slope the compression force required of the set of four springs 36a, 36b, 36c and 36d which spread the four jaws both outward and backward when the knob 22 is turned counterclockwise would be excessive. While the slope of a cone 56 in the illustrated form is 18°, the degree of the slope should be preferably not less than 15° and preferably not more than 25°. It will be seen from FIGS. 2 and 3 that the cone shaped portion 56 of each jaw is located a little past center toward the open end of the chuck so that it is the point end of the drill where the higher percentage of the gripping force is applied, to prevent the end of the drill from vibrating during the grinding operation and to keep the axis of all four jaws parallel with the axis of the chuck, whether or not a drill is gripped in the chuck, and to maintain contact between the flat circular end 58 of the second bushing 34 and the flat surface of the jaws identified by number 60 and not at the end of the jaws.

The body 32 of the chuck 18 is shaped to provide a straight cylinder portion 62 forward of the sloping wall section 64 (the inner surface of which contacts the slope 56 adjacent the forward end of each chuck jaw 34a, 34b, 34c and 34d). This straight cylinder portion 62 comprises one of the bearing surfaces for each of fixtures 20 and 30 as to be more fully detailed hereinafter.

The bushing 38, which is threaded to the rear end of the cylindrical housing 32 of the chuck 18 and into which is threaded the threads of 44 of the hand knob member 42, has further external threads 66 and annular flange 68, the rear face of which slopes as at 70. The sloping face 70 is adapted to engage the sloping face 72 of a ring 74 to which is secured the pair of cam elements 26 and 28. The mating faces 70 and 72 form means for clutching the pair of cams 26 and 28 to the chuck in conjunction with the hand knob 76 which is threadedly engaged with the threads 66 of bushing 38. By rotating the hand piece 76 counterclockwise, the ring 74 carrying the pair of cams 26 and 28 is free to rotate on the bushing and by rotating the hand piece 76 in a clockwise direction, the ring is clamped at the mating faces 70 and 72 and the flat mating faces of the inner end of the hand piece 76 and the rearward end of the bushing 74.

THE CONTROL CAMS

Figure 11:
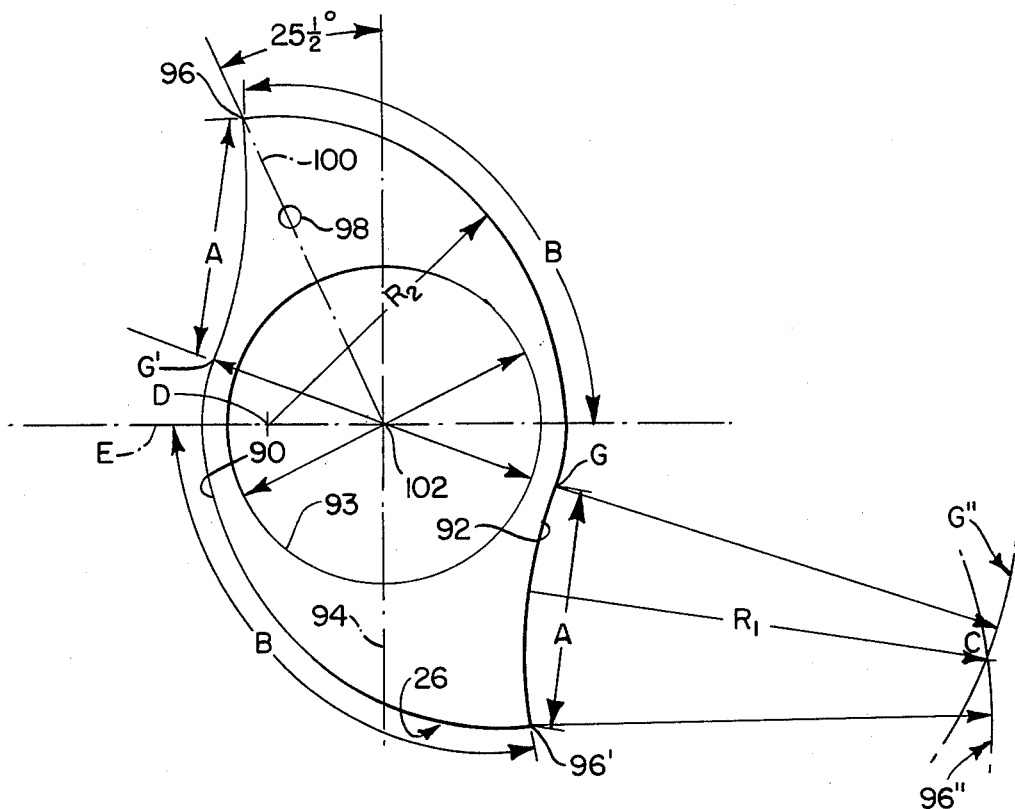
FIG. 11 comprises a layout for one of the cams of the drill sharpening device.
Figure 12:
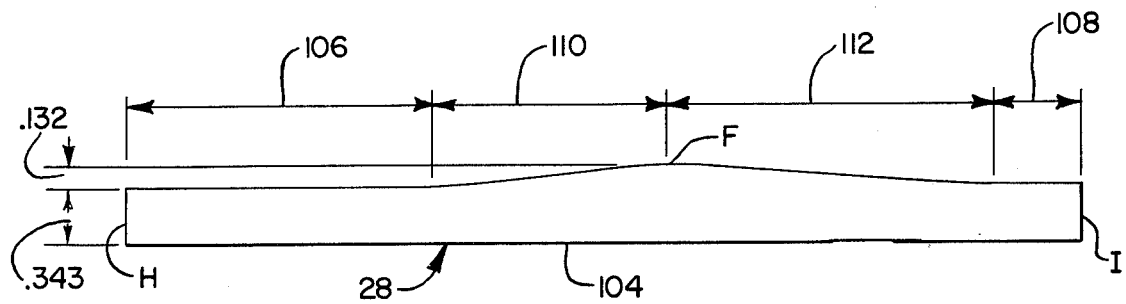
FIG. 12 comprises a developed showing of the other of the cams of the device.

Actual sharpening of the twist drills is controlled by the pair of cams 26 and 28 which are secured together such as by welding, and which are illustrated in FIGS. 11 and 12 of the drawing. The cams shown are for illustration purposes only and as illustrated are drawn to full scale.

Cam 26 has two active peripheral surfaces 90 and 92 which are complimentary to each other with one of the surfaces employed to sharpen one lip and the other surface is for sharpening control of the opposite lip of the drill. Each of the cam surfaces 90 and 92 is composed of two curved sections designated A and B with a gap of 20° therebetween as shown. Curve A is struck from point C and having a radius of 3⅛ inches while curve B is struck from point D and has a radius of 1 29/32 inches. Point C is located at the intersection of arc 96″ struck from point 96″ and arc G″ struck from point G. Point D is located on diameter E of opening 93 which diameter E is normal to a line 94 measured 125½ degrees from each cam tip 96 and 96′.

Included as a portion of the cam 26 is an opening 98 to receive a stop or aligning pin carried by the aligning fixture 20 to be more fully described hereinafter. Opening 98 is located on line 100 connecting tips 96 and 96′ and measured 1½ inches from the center 102 of the circular opening 93.

Cam 28 is illustrated in FIG. 12 in linear form and like cam 26 is drawn to full scale. The cam has a single high point F 0.475 inch above the straight edge 104 and this high point lies at the intersection of curves A and B designated point G on cam 26. The low zones of cam 28 comprise zones 106 and 108 which extend from edge H 2 inches toward high point F and from edge I 9/16 inch toward high point F respectively. The minimum height zones 106 and 108 are 0.343 inch from the straight base line 104. The remaining two zones 110 and 112 comprise, in the developed FIG. 12, straight lines intersecting at Point F and are 1⅞ inches in length for zone 110 and 2⅞ inches in length for zone 112. The two cams are assembled and secured such as by welding to the cam ring 74 hereinbefore described in reference to the chuck assembly.

THE ALIGNING FIXTURE

The aligning fixture 20 will be described in detail in reference to FIGS. 1, 2 and 4–6. The fixture comprises four main components, namely rear chuck bearing and brake assembly 116; front bearing assembly 118; aligning pawl device 120 and cam aligning means 112. Each of these structures is supported from a base plate 124 which is mounted, in the illustrated form of the invention, from the top of the motor housing 12, and each will be separately described.

The rear bearing and brake mechanism 116 comprises, as more clearly shown in FIGS. 1 and 4, a split bearing and the snugness of the bearing is controlled by a cap screw 126, FIG. 4 of the drawing. The cap screw adjusts the size of the bearing to snuggly receive the cylindrical barrel portion 32 of the chuck 18 so that the chuck can be freely rotated in the bearing. However, when it is desired to lock the chuck in the fixture 20, the extended handle portion 128 of the split bearing is pressed downwardly, thus immobilizing the chuck. The same bearing 116 is bored to receive the cam aligning pin 122 as more clearly shown in FIG. 2.

The aligning pin 122 includes a pin portion 130 and a stop member 132. The stop member determines how far the chuck is inserted in its pair of support bearings 116 and 118 while the pin 130 passes through the bore 98 in the cam 26 and fixes the position of both of the cams 26 and 28 in relation to the chuck body as to be more fully described hereinafter.

The forward bearing 118 is of simple construction and is bored to snuggly receive the straight end portion 62 of the chuck.

The drill lip aligning fixture 122 includes a mounting member 140 which rotatably receives a pawl or slide block carrying element 142. The mounting member 140 is also split as at 144 and the mounting member is provided with a lug 146 having a knurled cap 148 so that the position of the pawl carrying element 142 can be adjusted relative to the fixture or mounting means 140.

The pawl carrying element 142 is milled to provide an opening 150 which slidably receives a pair of pawls or slide blocks 152 and 154. A pair of bores 156 and 158 receives the ends of pins 160 and 162 which pins pass through slots 164 and 166 respectively in pawls 152 and 154. Flatened surfaces on each of the pins 160 and 162 seat springs 168 for pin 160 and 170 for pin 162. The opposite ends of each of the springs 168 and 170 engage the outward ends of slots 164 and 166 respectively and thus continuously urge the pawls radially outwardly of the mounting element 142. The assembly is completed by a retaining plate 172 which is secured to face 174 by a plurality of screws 176 as more clearly shown in FIGS. 5 and 6 of the drawing.

The aligning faces 180 and 182 of the pawls are stepped as at 184 and pitched at 5° starting at a point 0.005 inch to 0.006 inch off center from the center line of the pawls. The purpose for the 5° angle is to compensate for the gradual increase in web thickness of a standard twist drill which varies from 0.012 for the 1/16 inch diameter size up to about 0.082 inch thickness of the web for the standard 1/2 inch diameter drill. Further, the faces 180–182 of the pawls are sloped at an angle of about 32° from the center lines between the pawls.

It will be noted that the pawl carrying element 142 is marked at its top as at 186 and the upper surface of the support member 140 has a plurality of graduations as shown at 188. These graduations permit adjustment for changing the lip release angle to which the drill will be sharpened. For example, when the line 186 is set at the center line of the scale 188 when ground, the relief angle of the drill will be about exactly 12° and, by lossening the hand knob 148 and turning the housing 142 clockwise, the degree of the relief angle is increased and, by turning the housing counterclockwise, the degree of relief is reduced.

OPERATION OF DRILL SHARPENING DEVICE
PART I

With the chuck 18 out of the fixture 20 and the clutch 70–76 disengaged so that the integral cams 26, 28 rotate freely on the body of the chuck, the drill to be sharpened is inserted into the chuck to a depth where the cutting end of the drill extends about 1 inch beyond the end of the chuck and by turning the chuck tightening knob 42 clockwise the drill is lightly gripped. Next the chuck is inserted into the fixture 20 and as the insertion is being made, the pin 130 is caused to pass through the opening 98 in the cam 26 and as the chuck is pushed further into the fixture, two things happen, namely, the face of cam 26 becomes tightly compressed against the stop member 132 and the drill being in contact with the flat surface of the housing 142 between the pair of pawls 152 and 154 pushes into the chuck and this establishes a definite diminsion between the tip of the drill and the face of the cam 26. At this point, the chuck control knob 42 is tightened securely to tightly grip the drill in the chuck.

Figure 5:
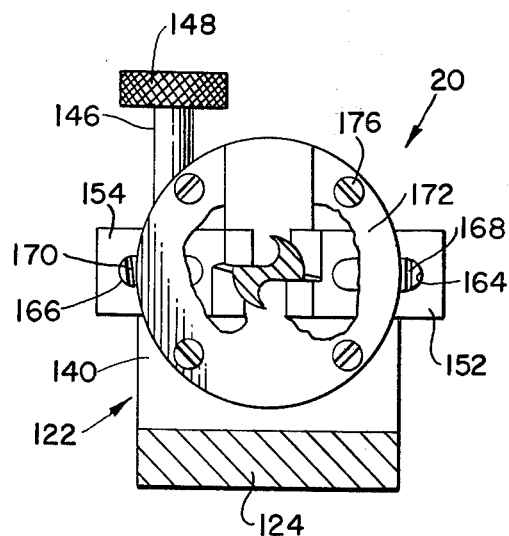
FIG. 5 is a section on line 5—5 of FIG. 2.

After the drill is tightened within the chuck, the pawls 152 and 154 are pressed inwardly to bring the steps 184 into contact with the outer end of the two cutting lips of the drill as the chuck and its secured drill are rotated in the fixture so that the cutting lips in relations to the pawls are as shown in FIG. 5 of the drawing. When this alignment is completed, the brake or clutch lever arm 128 is pressed downwardly to tightly grip the body of the chuck in the rear bearing element 116 and then the hand knob 76 is tightened, thus locking the integral pair of cams 26 and 28 at their required location in relation to the two cutting lips of the drill, regardless of the size of the drill. When the cams are secured, the break handle 128 is released so that the chuck, cams and drill can be removed from the first aligning fixture and placed in the drill grinding fixture.

DRILL GRINDING FIXTURE

The drill grinding fixture will be described in reference to FIGS. 1 and 7–10. The fixture generally designated 30 includes a chuck receiving fixture 200 into which the chuck 18 is inserted for the drill sharpening operation. The fixture 200 is mounted on a base 202 and the only attachment between the fixture 200 and its base 202 is with a shoulder bolt 204 which is tightly threaded as at 206 into the front end of the fixture 200 with the shoulder portion 208 of the shoulder bolt 204 free to rotate in a sleeve bearing 210 located in the front end of the fixture base 202. The fixture 200, therefore, is free to hinge or swing from side to side over the top surface 212 of its base 202.

Figure 8:
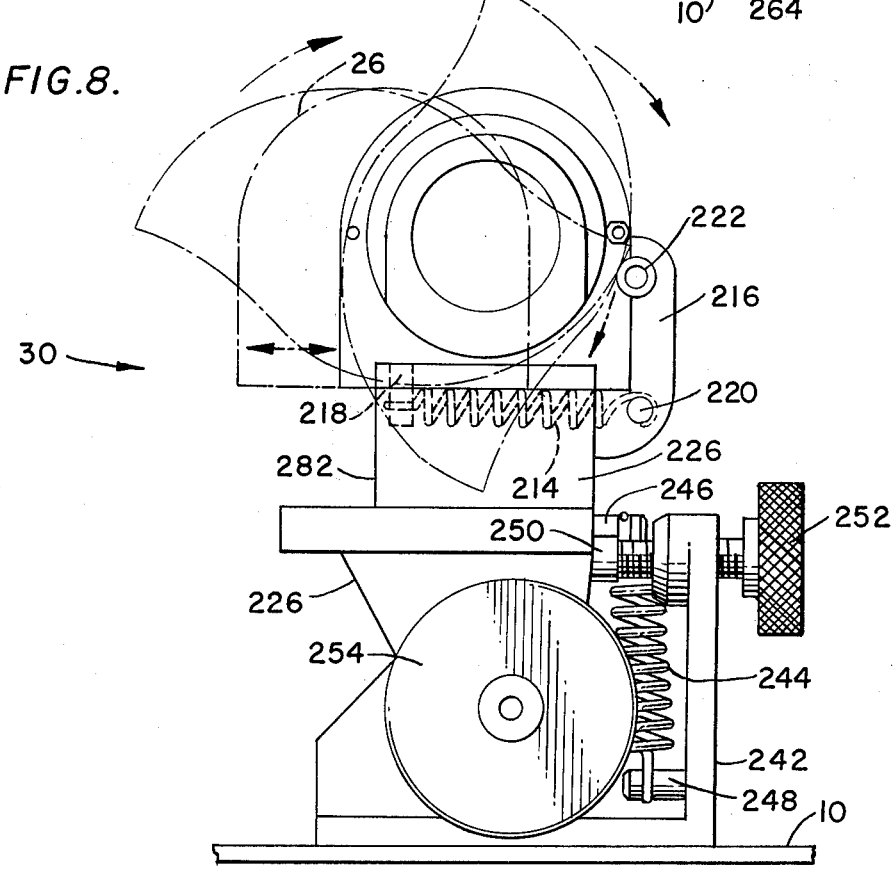
FIG. 8 is an end elevational view of the mechanism shown in FIG. 7 illustrating angular translation of the grinding fixture upon movement of one of the cams in relation to one of the cam followers.

The center line of the fixture 200 is held in alignment with the center line of the base by a tensile spring 214 which keeps the fixture 200 held tight against a stop 216 secured to the base 202. One end of the tensile spring 214 is connected to the fixture 200 by a pin 218 and the other end of the spring 214 is connected to the stop 216 by a second pin 220. As will be described in further detail, as the chuck 18 is manually rotated in the pair of bearing elements 215 and 217 forming an integral part of the fixture 200 with the active surface of the cam 26 of the two integral cams in contact with a cam follower 222, the chuck 18 and its fixture 200 are hinged to the left away from the stop 222 about 15° and then to the right back to the stop, which in turn sweeps the lip of the drill 24 being sharpened to the right across the face of the grinding wheel 14 and then back to the left as shown in FIG. 8. At the same time, cam 28 is pressed into contact with first one then the other of cam follows 223 and 225.

The base 202 for the fixture 200 in turn is hinge mounted to a mid-base portion 226 by having the round head 208 of the shoulder bolt 204 positioned within a loose bore 228 located in the front end of the mid-base portion 226 and with one bolt 230 passing through a curved slot 232, permiting the base 202 to hinge 45° over the top face of the mid-base portion 226. With the one bolt 230 the base for the fixture 200 can be tightly bolted to the mid-base portion. The radius of the 45° curved slot 232 is about 1 9/16 inches from the center-line of the bore 228 in which the head of the shoulder bolt 204 fits, and with this adjustment the center-line of the chuck 18, the fixture 200 for the chuck, and the base 200 for the fixture can be set to grind and sharpen the point of the drill to any degree from a 90° to 135° included angle.

The mid-base portion 226 has a bore 134 at the bottom which telescopes over an arbor 236 on which the mid-base portion 226 can both rock from side to side to move the end of the drill, or a wheel dresser, across the face of the grinding wheel 14 and also slide in and out over the arbor 236 toward or back away from the face of the grinding wheel, and, as previously mentioned, this two way action, or movement, is an important feature in the overall concept of this invention because it eliminates the need for a double set of slotted or dovetail ways conventionally used, plus, the assembly eliminates the need for costly and complicated methods conventionally required and used to shield such slide way means from grinding wheel grit.

The arbor 236 on which the mid-base portion 226 rocks and slides is rigidly bolted as at 240 to a sub-base 242 which in turn is rigidly bolted to the main base 10 of the sharpener, The means used to move the end of the drill, or the wheel dresser, across the face of the grinding wheel 14 is best illustrated in FIG. 8. A tensile spring 244, connected to the top end of the mid-base 226 by a pin 246 and to the sub-base 242 portion by a pin 248, keeps the mid-base portion 226 in tight contact with the end 250 of a hand knob 252, and by turning the knob 252 clockwise the end of the drill, or the wheel dresser, is moved across the face of the grinding wheel to the left and by turning the knob counterclockwise to the right.

The cutting end of the drill is moved toward the face of the grinding wheel by turning a hand knob 254 clockwise. When this knob 254 is turned, a coil spring 256, FIG. 7 is compressed as the bore 234 of the mid-base 226 is slid along the length of the arbor 236 and when turned counterclockwise the compression spring 256 reverses the slide action.

Figure 7:
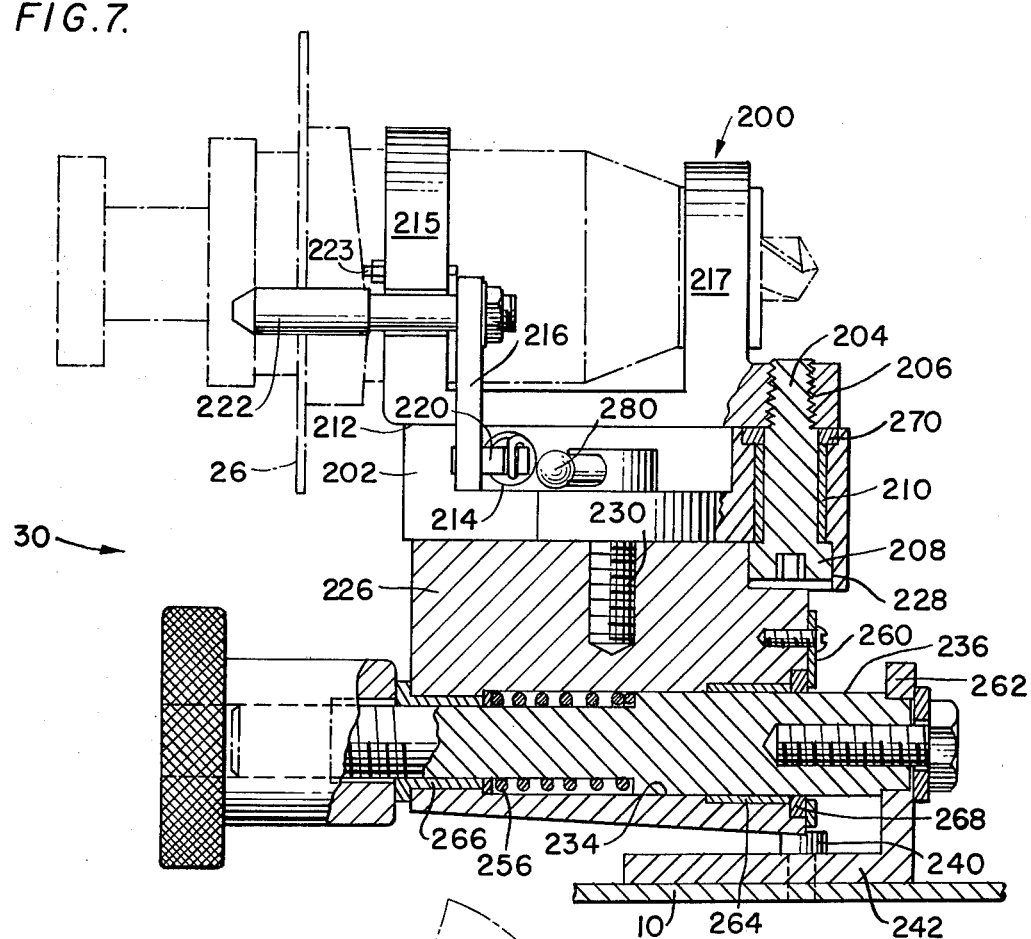
FIG. 7 is a fragmentary partial sectional view of the grinding fixture shown in FIG. 1 of the drawing.

Referring to FIG. 7, the end 260 of the mid-base 226 is spaced from the upright portion 262 of the sub-base 242 about ¾ inch. One-eighth inch of the ¾ inch adjustment is provided for bringing the lip of the drill into contact with the face of the grinding wheel prior to starting the actual sharpening operation and the difference of ⅝ inch is used to allow for the diameter of the grinding wheel becoming smaller due to wear and dressing. The rocker-slide arrangement is equipped with greast contained porous bronze bearings 264–266 and is packed with grease at the time of manufacture with a felt wash 268 being used to seal the bearing surface from grinding wheel grit.

Referring again to FIG. 7, the top end of bearing 210 is also sealed and shielded from grinding wheel grit by a felt washer 270.

THE SHARPENING PROCEDURE

Figure 9:
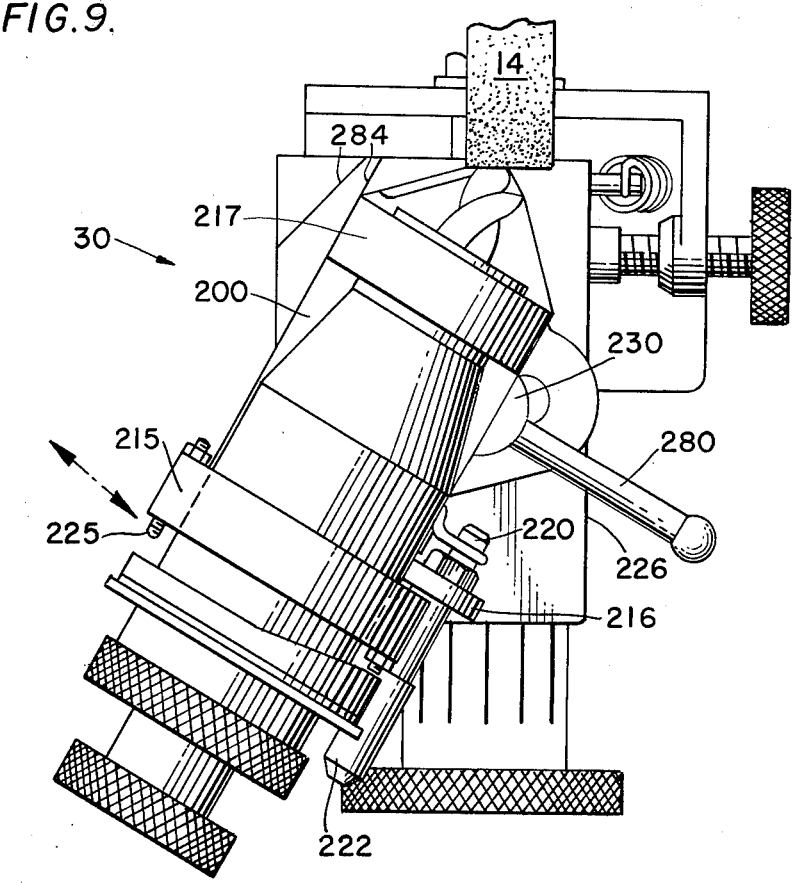
FIG. 9 is a top plan view of the structures shown in FIGS. 7 and 8.
Figure 10:
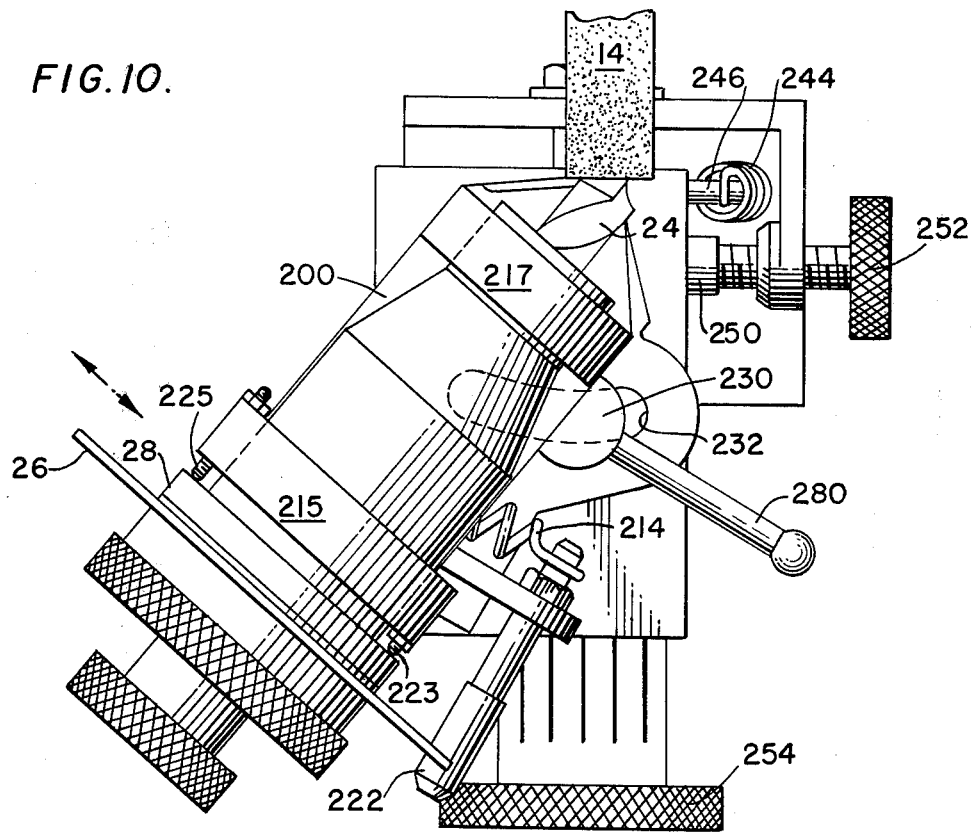
FIG. 10 is a view like FIG. 9 with the drill holding chuck displaced 15° from that illustrated in FIG. 9.

Firstly, the handle 280 of bolt 230 is loosened and the edge 282 of the fixture 200 is pivoted relative to the upper flat surface of the mid-base portion 226, having angle indicia lines 284 on its surface as shown in FIG. 9, to line the mid-base for the proper angle for the drill. As shown in FIG. 9, these elements are set to produce a 118° included point angle as shown on the angle scale 284.

With this set, the handle 280 is rotated to tighten the adjustment screw 230 so that the base 202 and the mid-base 226 function as a unitary element. Now the chuck 18 having the drill 24 loaded and aligned as hereinbefore described is inserted in the fixture 200 for rotation in bearings 215 and 217. Next, the chuck is rotated in the fixture to where the lips of the drill are at a horizontal plane and the high point F of the feeding cam 28 is in contact with its follower 222. To sharpen the lip cutting edges and to produce the required relief angle, the drill chuck is merely rotated in the fixture 200 as the face of the feeding cam 28 is kept in contact first with its follower 223 and then 225.

The action produced by the pair of integral cams, the instance that rotation of the chuck 18 starts due to the slope of the feeding cam 28, the drill chuck moves through the fixture and the lips of the drill are fed toward the face of the grinding wheel 14 for a distance of about 0.058 inch, and, hence, in this way the only action which takes place if it were not for cam 26 would be to grind off the end of the drill. However, simultaneously as the end of the drill is being rotated about 90° and the end of the drill is fed toward the face of the grinding wheel, the swing cam 26 in contact with its follower 22 swings the fixture 200 and the chuck 18 to the left which in turn swings the end of the drill 24 to the right producing a 12° relief angle on the drill.

In the event the drill had been badly damaged, it might be necessary after completely rotating the chuck in the fixture 200 to cause the fixture to be moved toward the grinding wheel by rotation of the in feed knob 254 so that additional stock can be removed from the drill in small increments to prevent over heating and burning of the drill.

After major sparking between the drill and the grinding wheel is over, the chuck 18 containing the drill is removed from the fixture 200, the gripping jaws of the chuck are loosened and the bit is removed completing the drill sharpening operation.

From the foregoing description of a preferred embodiment of the present invention, it will be seen that the relatively simple but highly versatile drill grinding device fully accomplishes the aims and objects hereinbefore set forth and others.

I claim:

1. A twist drill sharpener comprising a rotary grinding wheel, a twist drill chuck, said chuck having a cylindrical body, dual drill grinding control cams rotatably mounted on said chuck, and means for locking the dual cams against rotation relative to said chuck, means for aligning the lips of a twist drill to be sharpened with said dual cams, said aligning means including a first fixture adapted to receive the cylindrical body of the chuck, said first fixture including means engaging the said dual cams and a pair of opposed blocks, means mounting each of said opposed blocks for sliding movement toward and away from each other and into engagement with the lips of the chuck supported twist drill and in a plane transverse to the longitudinal axis of the twist drill to be sharpened, a second fixture adapted to rotatably and slidably receive the cylindrical body of the chuck, means mounting said second fixture so that the longitudinal axis of the cylindrical body of the chuck intersects a surface of the grinding wheel and said means including means for angular displacement of the chuck support on a vertical axis relative to the grinding wheel, and first and second cam followers on said second fixture adapted to be engaged by the control cams on said chuck.

2. The twist drill sharpener as defined in claim 1 wherein said first fixture includes a brake means for immobilizing the drill chuck in said fixture.

3. The twist drill sharpener as defined in claim 1 wherein the opposed faces of said slide blocks are stepped and said steps engage opposed lips of the drill to be sharpened.

4. A twist drill sharpener as defined in claim 1 wherein said first cam follower in cooperation with one of said cams is effective to cause said chuck to move toward and away from the grinding wheel when the chuck is rotated.

5. A twist drill sharpener as defined in claim 4 wherein said second cam follower in conjunction with the other of said cams is effective to cause the angular displacement of the chuck when the chuck is rotated.

6. A twist drill sharpener as defined in claim 1 wherein the means for angularly displacing the chuck support relative to the grinding wheel comprises one of said cam followers in cooperation with one of said dual cams when said chuck is rotated in the chuck receiving fixture.

7. The twist drill sharpener as defined in claim 1 including further means for moving the second fixture toward and away from the grinding wheel.

8. The twist drill sharpener as defined in claim 1 further including means for causing said second fixture to traverse the face of the grinding wheel.

9. The twist drill sharpener as defined in claim 7 further including means for causing said second fixture to traverse the face of the grinding wheel.

10. A twist drill sharpener as defined in claim 1 characterized in that the dual drill grinding control cams are integral.

11. The twist drill sharpener as defined in claim 1, including further means for moving the second fixture toward and away from the grinding wheel, means for causing said second fixture to traverse the face of the grinding wheel, and means for pivoting said second fixture about a vertical axis to thereby vary the point angle of the twist drill to be sharpened.

12. A twist drill sharpener including a rotary grinding wheel, a twist drill chuck, and grinding control cams: characterized in that the cams are rotatably mounted on the chuck and the chuck includes means for locking the cams against rotation relative to said chuck, and means for aligning the lips of a twist drill to be sharpened with the chuck carried cams, said aligning means including a fixture adapted to receive the chuck and said fixture including means engaging the grinding control cams and further including a pair of opposed blocks, means mounting each of said opposed blocks for sliding movement toward and away from each other and into engagement with the lips of the chuck supported twist drill and in a plane transverse to the longitudinal axis of the twist drill to be sharpened.

13. The twist drill sharpener as defined in claim 12 wherein said fixture includes a brake means for immobilizing the drill chuck in said fixture.

14. The twist drill sharpener as defined in claim 12 wherein the opposed faces of said slide blocks are stepped and said steps engage opposed lips of the drill to be sharpened.

15. The twist drill sharpener as defined in claim 12 wherein the opposed faces of said slide blocks are stepped and pitched at an angle of 5°, and said steps engage opposed lips of the drill to be sharpened, and wherein said opposed faces are sloped at an angle of about 32° from the center line thereof.

16. A twist drill sharpener comprising a rotary grinding wheel, a twist drill chuck, said chuck having a cylindrical body, dual drill grinding control cams rotatably mounted on said chuck, and means for locking the dual cams against rotation relative to said chuck, means for aligning the lips of a twist drill to be sharpened with said dual cams, said aligning means including a first fixture adapted to receive the cylindrical body of the chuck, said first fixture including means engaging the said dual cams and a pair of opposed blocks slidable into engagement with the lips of the chuck supported twist drill, said slide blocks being rotatably mounted in said first fixture to adjust the aligning means for different drill relief angles, a second fixture adapted to rotatably and slidably receive the cylindrical body of the chuck, means mounting said second fixture so that the longitudinal axis of the cylindrical body of the chuck intersects a surface of the grinding wheel and said means including means for angular displacement of the chuck support on a vertical axis relative to the grinding wheel, and first and second cam followers on said second fixture adapted to be engaged by the control cams on said chuck.

17. A twist drill sharpener including a rotary grinding wheel, a twist drill chuck, and grinding control cams: characterized in that the cams are rotatably mounted on the chuck and the chuck includes means for locking the cams against rotation relative to said chuck, and means for aligning the lips of a twist drill to be sharpened with the chuck carried cams, said aligning means including a fixture adapted to receive the chuck and said fixture including means engaging the grinding control cams and further including a pair of opposed blocks slidable into engagement with the lips of the chuck supported twist drill, wherein the said slide blocks are rotatably mounted in said first fixture to adjust the aligning means for different drill relief angles.

* * * * *